(12) United States Patent
Weng

(10) Patent No.: US 10,211,738 B2
(45) Date of Patent: Feb. 19, 2019

(54) DC-DC CONVERSION CIRCUIT SYSTEM AND FORMING METHOD THEREOF

(71) Applicants: Semiconductor Manufacturing International (Shanghai) Corporation, Shanghai (CN); Semiconductor Manufacturing International (Beijing) Corporation, Beijing (CN)

(72) Inventor: Qian Weng, Shanghai (CN)

(73) Assignees: SEMICONDUCTOR MANUFACTURING INTERNATIONAL (SHANGHAI) CORP., Shanghai (CN); SEMICONDUCTOR MANUFACTURING INTERNATIONAL (BEIJING) CORP., Beijing (CN)

( * ) Notice: Subject to any disclaimer, the term of this patent is extended or adjusted under 35 U.S.C. 154(b) by 0 days.

(21) Appl. No.: 15/976,090

(22) Filed: May 10, 2018

(65) Prior Publication Data
US 2018/0337604 A1    Nov. 22, 2018

(30) Foreign Application Priority Data
May 17, 2017 (CN) .......................... 2017 1 0345448

(51) Int. Cl.
*H02M 3/158* (2006.01)
*H02M 1/15* (2006.01)
(52) U.S. Cl.
CPC ........... *H02M 3/1584* (2013.01); *H02M 1/15* (2013.01)

(58) Field of Classification Search
CPC ...... H02M 1/15; H02M 3/155–3/1588; H02M 2001/0025
See application file for complete search history.

(56) References Cited

U.S. PATENT DOCUMENTS 5,307,407 A * 4/1994 Wendt .................. H04M 19/02
379/253
5,734,878 A * 3/1998 Hongo ...................... G06F 1/08
713/600

(Continued)

*Primary Examiner* — Yusef A Ahmed
(74) *Attorney, Agent, or Firm* — Brinks Gilson & Lione

(57) ABSTRACT

The present application relates to the field of circuit design, and discloses a DC-DC conversion circuit system and a forming method thereof. The system may include a primary switch circuit, a charge/discharge circuit, and a secondary switch circuit. The primary switch circuit includes a voltage supply end configured to receive a first direct current voltage and an output end. The charge/discharge circuit includes an input end connected to the output end of the primary switch circuit, and a first output end configured to output a second direct current voltage. The secondary switch circuit includes a voltage supply end configured to receive the first direct current voltage, and an output end connected to the output end of the primary switch circuit. The primary switch circuit is configured to control the charge/discharge circuit to charge or discharge. When a charging current or a discharging current of the charge/discharge circuit is greater than a corresponding threshold, the secondary switch circuit is configured to shunt the charging current or the discharging current. The present application can effectively suppress a ripple of an output voltage, and improve stability of the DC-DC conversion circuit system.

6 Claims, 6 Drawing Sheets

(56) References Cited

U.S. PATENT DOCUMENTS

| | | | | |
|---|---|---|---|---|
| 8,085,020 B1* | 12/2011 | Bennett | ............ | H02M 3/156 |
| | | | | 323/282 |
| 8,912,778 B1* | 12/2014 | Bennett | ............ | H02M 3/156 |
| | | | | 323/283 |
| 2005/0168263 A1* | 8/2005 | Fukuda | ............ | H02M 3/073 |
| | | | | 327/535 |
| 2007/0194765 A1* | 8/2007 | Chen | ............ | H02M 3/156 |
| | | | | 323/267 |
| 2008/0219399 A1* | 9/2008 | Nary | ............ | H03K 21/10 |
| | | | | 377/47 |
| 2009/0189578 A1* | 7/2009 | Chen | ............ | H02M 3/1588 |
| | | | | 323/282 |
| 2010/0226149 A1* | 9/2010 | Masumoto | ............ | H02M 1/4225 |
| | | | | 363/20 |
| 2011/0148374 A1* | 6/2011 | Gizara | ............ | H02M 3/157 |
| | | | | 323/282 |
| 2012/0126768 A1* | 5/2012 | Ishino | ............ | H02M 3/156 |
| | | | | 323/283 |
| 2013/0043851 A1* | 2/2013 | Ishino | ............ | H02M 3/156 |
| | | | | 323/282 |
| 2014/0009192 A1* | 1/2014 | Suzuki | ............ | H03L 7/095 |
| | | | | 327/115 |
| 2014/0035541 A1* | 2/2014 | Jin | ............ | G05F 1/70 |
| | | | | 323/210 |
| 2015/0137778 A1* | 5/2015 | Miyazaki | ............ | H02M 3/156 |
| | | | | 323/271 |
| 2015/0280567 A1* | 10/2015 | Fukumoto | ............ | H02M 3/156 |
| | | | | 323/271 |
| 2016/0087526 A1* | 3/2016 | Satake | ............ | H02M 1/36 |
| | | | | 323/282 |
| 2017/0187287 A1* | 6/2017 | Zuo | ............ | H02M 1/08 |
| 2018/0183253 A1* | 6/2018 | Chen | ............ | H02J 7/0052 |

* cited by examiner

DC-DC CONVERSION CIRCUIT SYSTEM AND FORMING METHOD THEREOF

CROSS REFERENCE TO RELATED APPLICATIONS

This application is based on and claims priority to Chinese patent Application CN 201710345448.0, filed May 17, 2017, the entire content of which is incorporated herein by reference.

BACKGROUND

Technical Field

The present application relates to the field of circuit design, and in particular, to a DC-DC conversion circuit system and a forming method thereof.

Related Art

DC-DC (direct current to direct current), as a power module, is widely applied to various electronic products, and provides a high-efficient and stable working voltage for its back-end circuit. During application, a user cares about the stability and the output efficiency of the DC-DC. Usually, to obtain a DC-DC output having a small fluctuation, the user may use a relatively large inductor-capacitor discrete element at an output stage. However, although using a large discrete element may reduce the fluctuation of the DC-DC output, many negative effects may be caused. The large discrete element increases the cost and the power consumption, and has severe electromagnet interferences. How to reduce the fluctuation of the DC-DC output without enlarging the discrete element is a problem.

SUMMARY

A technical problem to be addressed by the present application is to provide a DC-DC conversion circuit system that can effectively suppress a ripple of an output voltage, and a method for forming the system.

According to an aspect of this application, a DC-DC conversion circuit system is provided, including: a primary switch circuit, a charge/discharge circuit, and a secondary switch circuit. The primary switch circuit comprises a voltage supply end configured to receive a first direct current voltage and an output end. The charge/discharge circuit comprises an input end connected to the output end of the primary switch circuit, and a first output end configured to output a second direct current voltage. The secondary switch circuit comprises a voltage supply end configured to receive the first direct current voltage, and an output end connected to the output end of the primary switch circuit. The primary switch circuit is configured to control the charge/discharge circuit to charge or discharge. When a charging current or a discharging current of the charge/discharge circuit is greater than a corresponding threshold, the secondary switch circuit is configured to shunt the charging current or the discharging current.

In some forms, the primary switch circuit includes a first PMOS transistor and a first NMOS transistor; and the secondary switch circuit includes a second PMOS transistor and a second NMOS transistor, where a dimension of the second PMOS transistor is smaller than a dimension of the first PMOS transistor, and a dimension of the second NMOS transistor is smaller than a dimension of the first NMOS transistor.

In some forms, the dimension of the second PMOS transistor is between $1/30$ to $1/10$ of the dimension of the first PMOS transistor, and the dimension of the second NMOS transistor is between $1/5$ to $1/2$ of the dimension of the first NMOS transistor.

In some forms, the dimension of the second PMOS transistor is $1/20$ of the dimension of the first PMOS transistor, and the dimension of the second NMOS transistor is $1/3$ of the dimension of the first NMOS transistor.

In some forms, the system further includes a feedback circuit configured to provide control signals for the primary switch circuit and the secondary switch circuit. The feedback circuit includes a first end connected to a second output end of the charge/discharge circuit, and a second end connected to a signal end of the primary switch circuit. The second end of the feedback circuit is connected to a signal end of the secondary switch circuit by means of a frequency dividing circuit.

In some forms, the frequency dividing circuit includes: a NAND gate circuit, a first frequency dividing circuit, and a second frequency dividing circuit. The first frequency dividing circuit comprises an input end connected to the second end of the feedback circuit, and an output end connected to a first input end of the NAND gate circuit. The second frequency dividing circuit comprises an input end connected to the second end of the feedback circuit, and an output end connected to a second input end of the NAND gate circuit. An output end of the NAND gate circuit is connected to the signal end of the secondary switch circuit.

In some forms, the first frequency dividing circuit is an even frequency dividing circuit; and the second frequency dividing circuit is an odd frequency dividing circuit.

In some forms, the first frequency dividing circuit is a frequency-halving circuit; and the second frequency dividing circuit is a frequency-quintiling circuit.

According to another aspect of this application, a method for forming a DC-DC conversion circuit system is provided, including: providing a primary switch circuit, a charge/discharge circuit, and a secondary switch circuit; applying a first direct current voltage at a voltage supply end of the primary switch circuit; connecting an input end of the charge/discharge circuit to an output end of the primary switch circuit, so that a first output end of the charge/discharge circuit outputs a second direct current voltage; and applying the first direct current voltage at a voltage supply end of the secondary switch circuit, and connecting an output end of the secondary switch circuit to the output end of the primary switch circuit, where the primary switch circuit is configured to control the charge/discharge circuit to charge or discharge, and when a charging current or a discharging current of the charge/discharge circuit is greater than a corresponding threshold, the secondary switch circuit shunts the charging current or the discharging current.

In some forms, the method further includes: providing a feedback circuit that provides control signals for the primary switch circuit and the secondary switch circuit; connecting a first end of the feedback circuit to a second output end of the charge/discharge circuit; connecting a second end of the feedback circuit to a signal end of the primary switch circuit; and connecting the second end of the feedback circuit to a signal end of the secondary switch circuit by means of a frequency dividing circuit.

In some forms, the frequency dividing circuit includes a first frequency dividing circuit, a second frequency dividing circuit, and a NAND gate circuit, where an input end of the first frequency dividing circuit is connected to the second end of the feedback circuit, and an output end of the first frequency dividing circuit is connected to a first input end of the NAND gate circuit; an input end of the second frequency dividing circuit is connected to the second end of the feedback circuit, and an output end of the second frequency dividing circuit is connected to a second input end of the NAND gate circuit; and an output end of the NAND gate circuit is connected to the signal end of the secondary switch circuit.

Compared with the related art, the DC-DC conversion circuit system of this application includes a primary switch circuit, a charge/discharge circuit, and a secondary switch circuit. The charge/discharge circuit is controlled by the primary switch circuit to charge or discharge. When a charging current or a discharging current of the charge/discharge circuit is greater than a corresponding threshold, the secondary switch circuit may shunt the charging current or the discharging current, that is, suppress an instantaneous current output by the charge/discharge circuit. Therefore, a ripple of an output voltage can be effectively suppressed, and stability of the DC-DC conversion circuit system can be improved.

The exemplary forms of this application are described in detail below with reference to the accompanying drawings, so that other features and advantages of this application become clear.

BRIEF DESCRIPTION OF THE DRAWINGS

The accompanying drawings, as a part of the specification, illustrate forms of this application and serve to explain the principles of this application together with the description.

With reference to the accompanying drawings, this application may be appreciated more clearly according to the following detailed description, where.

DETAILED DESCRIPTION

Figure 1:
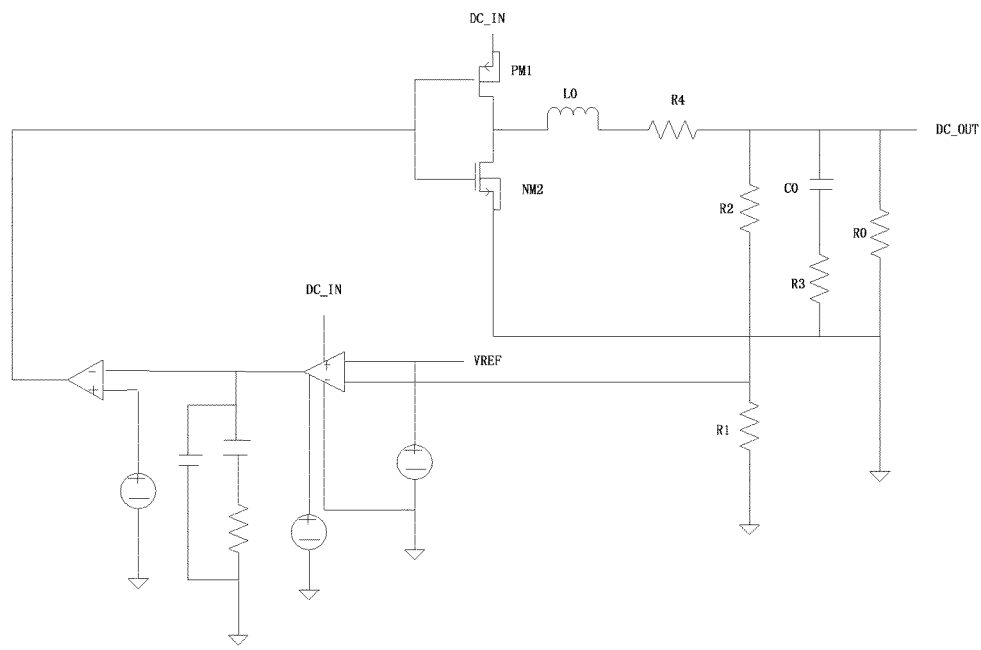
FIG. 1 is a schematic diagram of a DC-DC model according to the related art.

For illustration purposes, implementations of this application are described in detail with reference to the accompanying drawings. It should be noted that, unless otherwise specified, relative layouts, mathematical expressions, and numeric values of components and steps described in these forms do not limit the scope of this application.

Meanwhile, it should be appreciated that for ease of description, sizes of the parts shown in the accompanying drawings are not drawn according to an actual proportional relation.

The following description on at least one exemplary form is for illustration only, and should by no means be used as any limitation on this application or uses thereof.

Technologies, methods, and devices that are known by a person of ordinary skill in the related fields may not be discussed in detail. However, in proper cases, the technologies, methods, and devices should be considered as a part of the description.

In all examples shown and discussed herein, any specific value should be interpreted as illustrative only rather than a limitation. Therefore, other examples of the exemplary forms may have different values.

It should be noted that similar reference numerals and letters represent similar items in the following accompanying drawings. Therefore, once an item is defined in a figure, the item does not need to be further discussed in the subsequent figures.

To make the objectives, technical solutions, and advantages of this application more apparent, this application is further described below in detail with reference to the specific forms and the accompanying drawings.

FIG. 1 is a schematic diagram of a DC-DC model according to the related art. The DC-DC model includes a switch element whose output is connected to an RCL discrete element, where R0, L0, and C0 are a load and an LC filter, respectively. Series resistors including R1 and R2 form a bleeder circuit, and generate a feedback voltage. The feedback voltage is compared with a reference voltage VREF by an error amplifier. The comparison result determines whether to continue to charge a capacitor. Resistors R3 and R4 simulate resistance of an inductor L0 and the capacitor C0 during actual application. In a working process, output of the error amplifier and a triangular wave form input of a second-stage comparator, and an output signal of the second-stage comparator is a PWM signal that controls the switch element. In a stable period, if a waveform of an output voltage rises slowly, an output voltage fluctuation becomes smaller. However, the desired slow change of the output voltage cannot be achieved by adjusting the loads.

The inventor, through a plurality of experiments, enables the output voltage to rise slowly by bringing in a channel to change a transient change of an output current, thereby reducing the fluctuation of the voltage output. That is, an entire output current cannot be changed while an instantaneous current is changed, which effectively reduces an output ripple without affecting a waveform of the output voltage.

Figure 2:
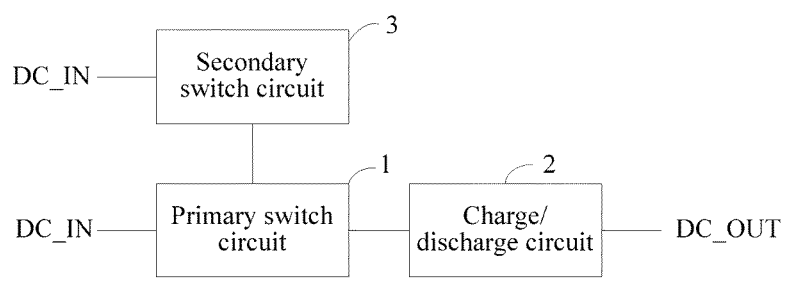
FIG. 2 is a schematic structural diagram of one form of a DC-DC conversion circuit system.

FIG. 2 is a schematic structural diagram of one form of a DC-DC conversion circuit system. The circuit system includes a primary switch circuit 1, a charge/discharge circuit 2, and a secondary switch circuit 3. A first direct current voltage DC_IN is applied to a voltage supply end of the primary switch circuit 1, and an output end of the primary switch circuit 1 is connected to an input end of the charge/discharge circuit 2. A first output end of the charge/discharge circuit 2 outputs a second direct current voltage DC_OUT. The first direct current voltage DC_IN is applied to a voltage supply end of the secondary switch circuit 3, and an output end of the secondary switch circuit 3 is connected to the output end of the primary switch circuit 1.

In this form, the charge/discharge circuit 2 may be controlled by the primary switch circuit 1 to charge or discharge. When a charging current or a discharging current of the charge/discharge circuit 2 is greater than a corresponding threshold (for example, at a moment of charging or discharging within a period, an instantaneous current is relatively high which will cause a direct current voltage output by the charge/discharge circuit 2 to fluctuate), the secondary switch circuit 3 may shunt the charging current or the discharging current, that is, suppress an instantaneous current output by the charge/discharge circuit 2. Therefore, a ripple of an output voltage can be effectively suppressed, and stability of the DC-DC conversion circuit system can be improved.

Figure 3:
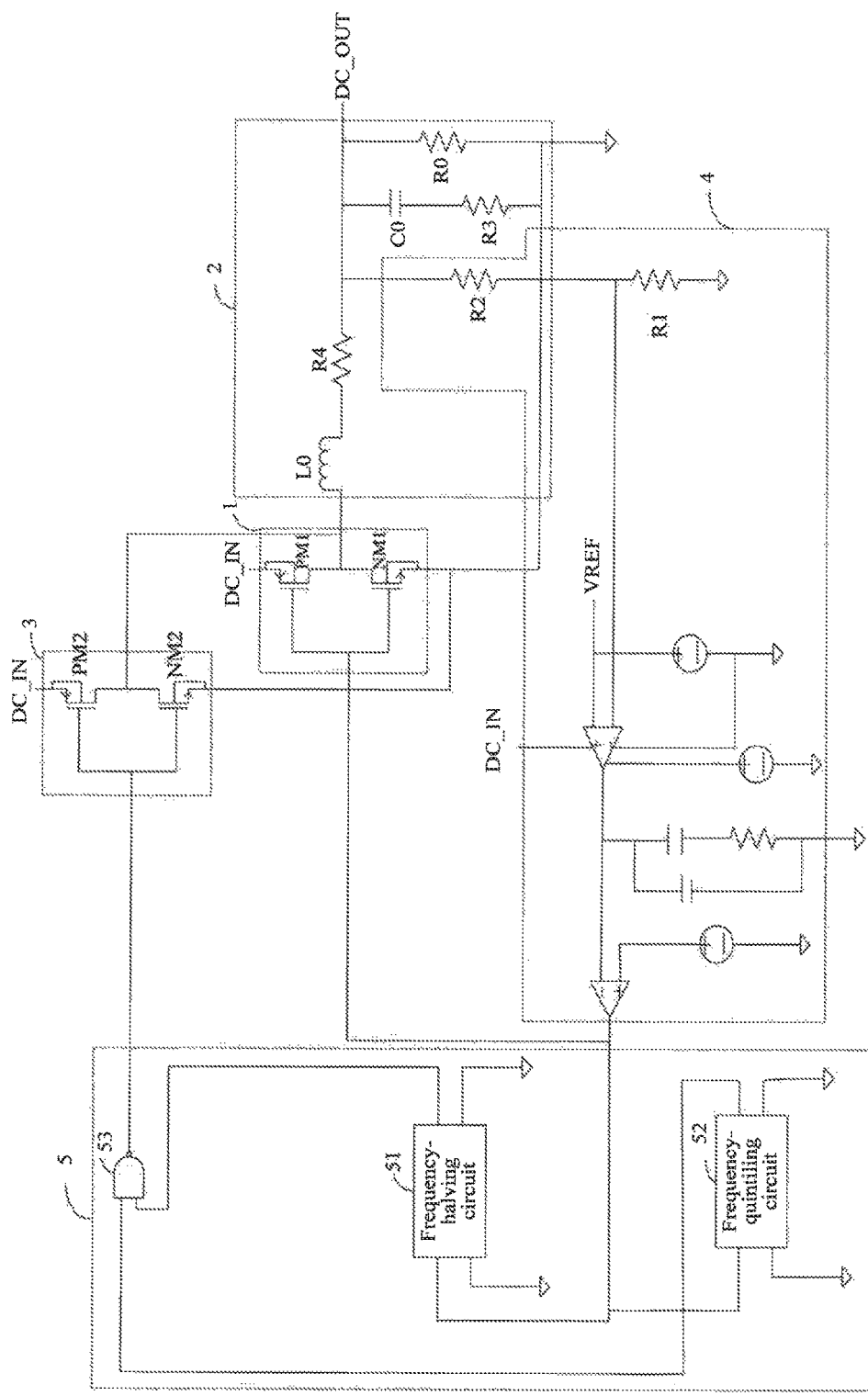
FIG. 3 is a schematic structural diagram of another form of a DC-DC conversion circuit system.

FIG. 3 is a schematic structural diagram of a DC-DC conversion circuit system according to this application. A primary switch circuit 1 includes a first PMOS transistor PM1 and a first NMOS transistor NM1. A secondary switch circuit 3 includes a second PMOS transistor PM2 and a second NMOS transistor NM2. A charge/discharge circuit 2 includes a RCL discrete element. That is, R0, L0, and C0 are a load and an LC filter, respectively; R3 simulates resistance of a capacitor C0 during an actual application; and R4 simulates resistance of an inductor L0 during an actual application, where R2 in the block diagram does not belong to the charge/discharge circuit 2.

A first direct current voltage DC_IN is applied to voltage supply ends of the primary switch circuit 1 and the secondary switch circuit 3. An output end of the primary switch circuit 1 is connected to an output end of the secondary switch circuit 3. An input end of the charge/discharge circuit 2 is connected to an output end of the primary switch circuit 1. A first output end of the charge/discharge circuit 2 outputs a second direct current voltage DC_OUT. When the charging current or the discharging current of the charge/discharge circuit 2 is greater than a corresponding threshold, in order to enable the secondary switch circuit 3 to shunt a charging current or a discharging current without changing an entire output current, a dimension of the second PMOS transistor PM2 should be smaller than that of the first PMOS transistor PM1, and a dimension of the second NMOS transistor NM2 should be smaller than that of the first NMOS transistor NM1.

In some forms, the dimension of the second PMOS transistor PM2 is between 1/30 to 1/10 of that of the first PMOS transistor PM1, and the dimension of the second NMOS transistor NM2 is between 1/5 to 1/2 of that of the first NMOS transistor NM1.

In some forms, the dimension of the second PMOS transistor PM2 is 1/20 of that of the first PMOS transistor PM1, and the dimension of the second NMOS transistor NM2 is 1/3 of that of the first NMOS transistor NM1.

In the foregoing forms, when the first PMOS transistor PM1 in the primary switch circuit is turned on, the second NMOS transistor NM2 in the secondary switch circuit is also turned on. Therefore, the second NMOS transistor NM2 may shunt a current flowing through the first PMOS transistor PM1, and generate a suppression effect. In addition, because the dimension of the second PMOS transistor PM2 is significantly smaller than that of the first PMOS transistor PM1, in a charging period, the second PMOS transistor PM2 does not serve as a main part. In a holding stage, the second NMOS transistor NM2 is turned on and shares a part of energy of the first NMOS transistor NM1. Therefore, a rising slope of the output is decreased.

In some forms of this application, the DC-DC conversion circuit system further includes a feedback circuit 4, where a first end of the feedback circuit 4 is connected to a second output end of the charge/discharge circuit 2, a second end of the feedback circuit 4 is connected to a signal end of the primary switch circuit 1, and the second end of the feedback circuit 4 is connected to a signal end of the secondary switch circuit 3 by means of a frequency dividing circuit 5, so as to provide control signals for the primary switch circuit 1 and the secondary switch circuit 3. The feedback circuit 4 includes series resistors including R1 and R2. A feedback voltage is output through voltage division, and the feedback voltage is compared with a reference voltage VREF by an error amplifier. Output of the error amplifier and a triangular wave form an input of a second-stage comparator. The primary switch circuit 1 is controlled to be on or off using an output of the second-stage comparator. For example, when a voltage of the first output end of the charge/discharge circuit 2 rises, the feedback voltage that is output through voltage division by the series resistors including R1 and the R2 is higher than the reference voltage VREF. In this case, a signal output by the second-stage comparator controls the first PMOS transistor PM1 to be turned off; otherwise, the first PMOS transistor PM1 is turned on to charge. In addition, the control signal of the secondary switch circuit 3 is provided through dividing the frequency of the control signal of the primary switch circuit 1 by the frequency dividing circuit 5.

In some forms, the frequency dividing circuit 5 includes a first frequency dividing circuit 51, a second frequency dividing circuit 52, and a NAND gate circuit 53. An input end of the first frequency dividing circuit 51 is connected to the second end of the feedback circuit 4, and an output end of the first frequency dividing circuit 51 is connected to a first input end of the NAND gate circuit 53. An input end of the second frequency dividing circuit 52 is connected to the second end of the feedback circuit 4, and an output end of the second frequency dividing circuit 52 is connected to a second input end of the NAND gate circuit 53. An output end of the NAND gate circuit 53 is connected to the signal end of the secondary switch circuit 3. The first frequency dividing circuit 51 is an even frequency dividing circuit; and the second frequency dividing circuit 52 is an odd frequency dividing circuit. For example, the first frequency dividing circuit 51 is a frequency-halving circuit, and the second frequency dividing circuit 52 is a frequency-trisecting circuit or a frequency-quintiling circuit. Considering the area of a circuit and the effect of an auxiliary switch, a frequency-quintiling circuit may be selected as the second frequency dividing circuit 52.

In the foregoing forms, the secondary switch circuit including the second PMOS transistor and the second NMOS transistor is added in the DC-DC conversion circuit system. Moreover, the control signal of the secondary switch circuit is obtained by performing frequency-halving and frequency-quintiling and then a NAND gate operation on the control signal of the primary switch circuit, and output of the NAND gate is the control signal of the secondary switch circuit. Within a period, because average values of output voltages and currents are given, by changing an instantaneous value, stability of the entire circuit may be optimized, and a maximum value of output voltage jitter may be reduced, so that the output voltage jitter is reduced. In addition, during a process in which the primary switch circuit controls the charge/discharge circuit to charge, the secondary switch circuit suppresses output of the charge/discharge circuit. However, the dimension of the second PMOS transistor PM2 is significantly smaller than that of the first PMOS transistor PM1, that is, the capability of the second PMOS transistor PM2 is relatively weak. Therefore, the entire output would not be affected.

Figure 4:
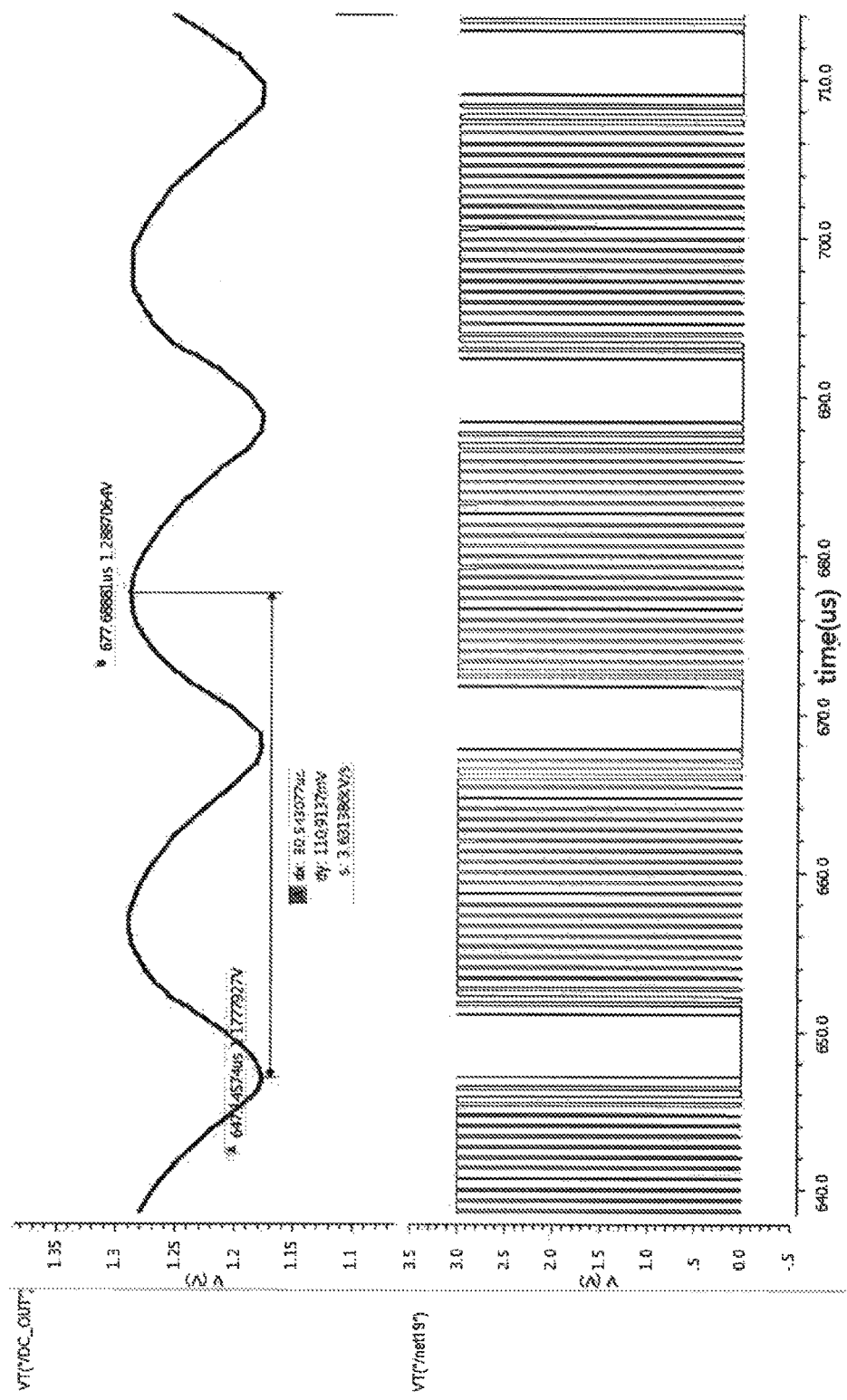
FIG. 4 is a schematic diagram of a voltage output waveform of a DC-DC model and a switch control signal according to the related art.
Figure 5:
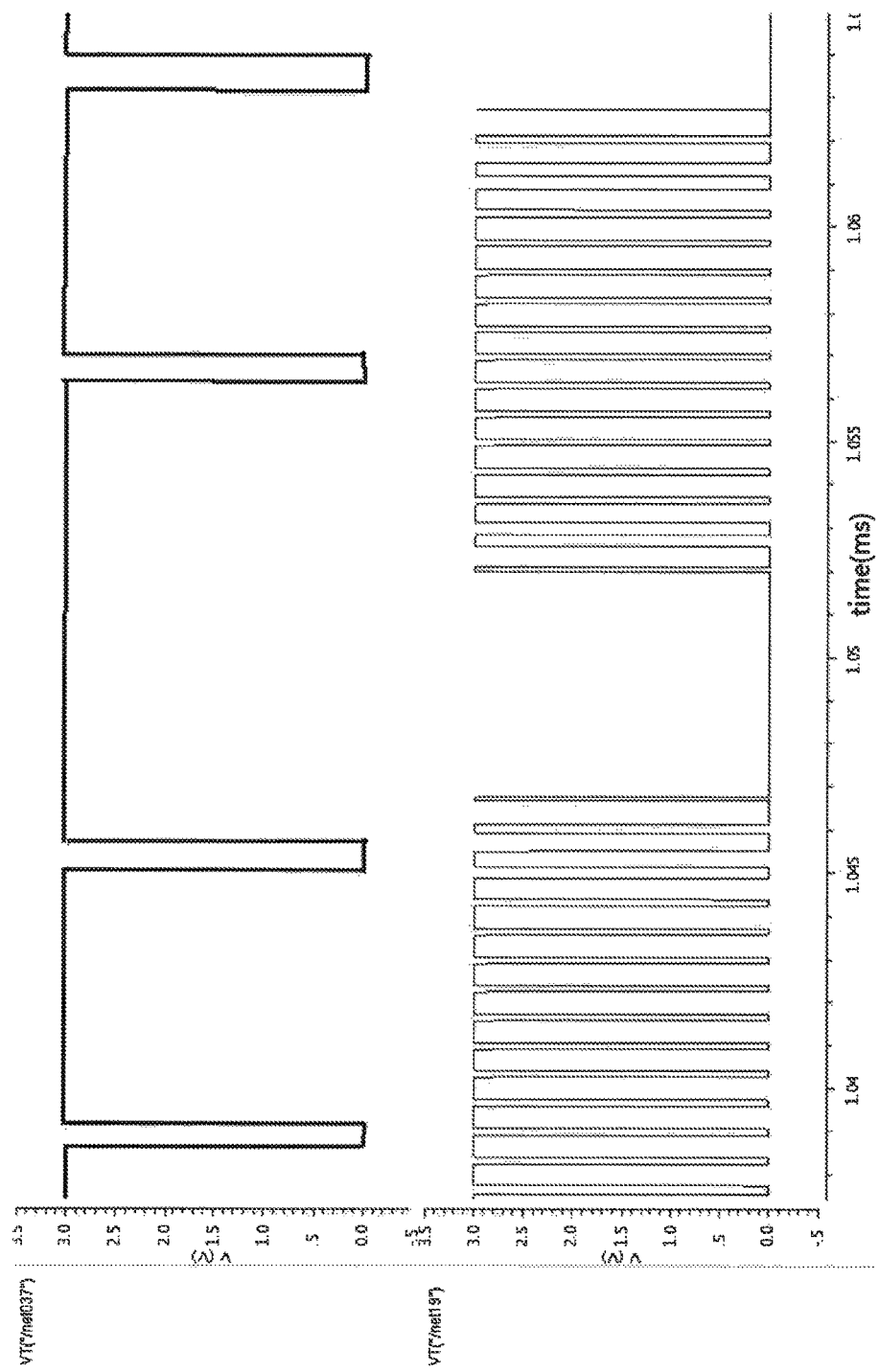
FIG. 5 is a schematic diagram of a control signal of one form of a DC-DC conversion circuit system.
Figure 6:
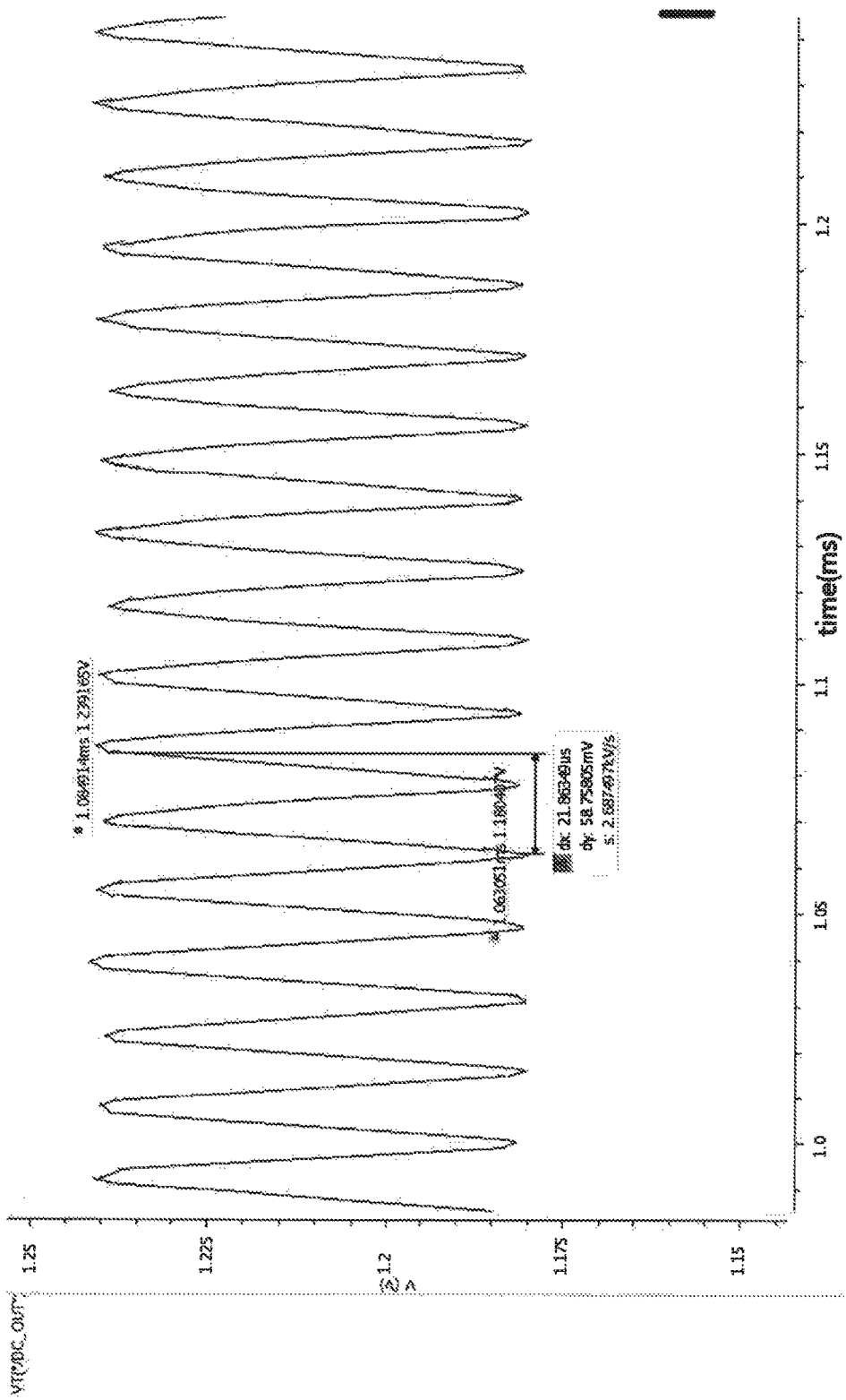
FIG. 6 is a schematic diagram of a voltage output waveform of one form of a DC-DC conversion circuit system.

In some forms, if the first direct current voltage DC_IN is 2.5 to 5 V, a frequency Fs is 500 KHz, the inductor L0 is 4.7 μH, the equivalent resistor R4 is 20 mΩ, the capacitor C0 is 47 μF, the equivalent resistor R3 is 20 mΩ, the resistor R1 is 60 KΩ, the resistor R2 is 20 KΩ, and the feedback voltage is 0.9 V, by using the related technology in FIG. 1, through simulation, the voltage output waveform of DC-DC and a switch control signal are shown in FIG. 4. An upper portion of FIG. 4 shows the voltage output waveform of the DC-DC, and a lower portion of FIG. 4 shows a PWM waveform of the switch control signal. It can be seen from the figure that a peak-to-peak fluctuation value is 110 mV. That is, the fluctuation value is +/−55 mV. By contrast, by using the DC-DC conversion circuit system in FIG. 3 of this application, the control signals of the primary switch circuit and the secondary switch circuit are shown in FIG. 5. An upper portion of FIG. 5 shows the control signal of the secondary switch circuit, and a lower portion of FIG. 5 shows the control signal of the primary switch circuit. It can be seen from the figure that the secondary switch circuit effectively compensates the control signal of the primary switch circuit. FIG. 6 shows a voltage output waveform of a DC-DC conversion circuit system. It can be seen from the figure that a voltage fluctuation is reduced from a fluctuation of +/−55 mV in FIG. 4 to +/−29 mV in FIG. 6.

As can be seen from the simulation and comparison, when the primary switch circuit of the DC-DC conversion circuit system in this application controls the charging, the secondary switch circuit suppresses the charging of the primary switch circuit. Within a stable period, the secondary switch circuit performs auxiliary charging twice on the primary switch circuit. However, since the capability of the secondary switch circuit is significantly weaker than that of the primary switch circuit, the two auxiliary charging operations are only a compensation to the suppression of the output voltage. Therefore, an output ripple is suppressed without affecting the output. By contrast, to achieve a same compensation result, a load capacitance of the prior circuit model should be increased by 50%, and the capacitance should be increased from 47 μF to 70 μF.

Figure 7:
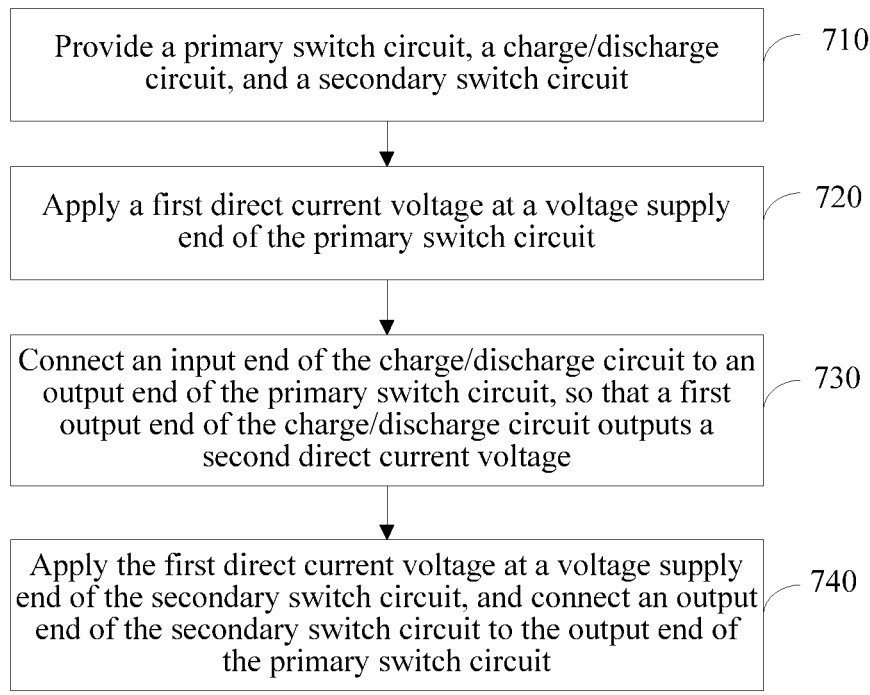
FIG. 7 is a schematic flowchart of a method for forming a DC-DC conversion circuit system.

FIG. 7 is a schematic flowchart of one form of a method for forming a DC-DC conversion circuit system.

In step 710, a primary switch circuit, a charge/discharge circuit, and a secondary switch circuit are provided.

In step 720, a first direct current voltage is applied at a voltage supply end of the primary switch circuit. The primary switch circuit includes a first PMOS transistor PM1 and a first NMOS transistor NM1.

In step 730, an input end of the charge/discharge circuit is connected to an output end of the primary switch circuit, so that a first output end of the charge/discharge circuit outputs a second direct current voltage.

In step 740, the first direct current voltage is applied at a voltage supply end of the secondary switch circuit, and an output end of the secondary switch circuit is connected to the output end of the primary switch circuit. The secondary switch circuit includes a second PMOS transistor PM2 and a second NMOS transistor NM2.

The primary switch circuit is configured to control the charge/discharge circuit to charge or discharge, and when a charging current or a discharging current of the charge/discharge circuit is greater than a corresponding threshold, the secondary switch circuit shunts the charging current or the discharging current.

A person of ordinary skill in the art should appreciate that the foregoing steps may be performed simultaneously or in no particular order.

In some forms, the charge/discharge circuit may be controlled by the primary switch circuit to charge or discharge. When the charging current or the discharging current of the charge/discharge circuit is greater than the corresponding threshold (for example, at a moment of charging or discharging within a period, an instantaneous current is relatively high which will cause a direct current voltage output by the charge/discharge circuit to fluctuate), the secondary switch circuit may shunt the charging current or the discharging current, that is, suppress an instantaneous current output by the charge/discharge circuit. Therefore, a ripple of an output voltage can be effectively suppressed, and stability of the DC-DC conversion circuit system can be improved.

In addition, when the charging current or the discharging current of the charge/discharge circuit is greater than the corresponding threshold, in order to enable the secondary switch circuit to shunt the charging current or the discharging current without changing an entire output current, a dimension of the second PMOS transistor PM2 needs to be smaller than that of the first PMOS transistor PM1, and a dimension of the second NMOS transistor NM2 needs to be smaller than that of the first NMOS transistor NM1. In some forms, the dimension of the second PMOS transistor PM2 is 1/20 of that of the first PMOS transistor PM1, and the dimension of the second NMOS transistor NM2 is 1/3 of that of the first NMOS transistor NM1.

In some forms of this application, a feedback circuit configured to provide control signals for the primary switch circuit and the secondary switch circuit is provided. A first end of the feedback circuit is connected to a second output end of the charge/discharge circuit. A second end of the feedback circuit is connected to a signal end of the primary switch circuit. The second end of the feedback circuit is connected to a signal end of the secondary switch circuit by means of a frequency dividing circuit. The frequency dividing circuit includes a first frequency dividing circuit, a second frequency dividing circuit, and a NAND gate circuit. An input end of the first frequency dividing circuit is connected to the second end of the feedback circuit, and an output end of the first frequency dividing circuit is connected to a first input end of the NAND gate circuit. An input end of the second frequency dividing circuit is connected to the second end of the feedback circuit, and an output end of the second frequency dividing circuit is connected to a second input end of the NAND gate circuit. An output end of the NAND gate circuit is connected to the signal end of the secondary switch circuit.

In the forms of this application, in balancing between an output load and a ripple of the DC-DC conversion circuit system, an output ripple suppression, that is, a secondary switch circuit, is added, thereby effectively reducing the output ripple without affecting an output waveform. Therefore, the user has more load options. In such a manner of adding a secondary switch circuit at an output stage, the secondary switch circuit is controlled using a frequency-divided signal, thus effectively suppressing the ripple of the output voltage.

Heretofore, this application is described in detail. To avoid obscuring the idea of this application, some details generally known in the art are not described. According to the foregoing description, a person of ordinary skill in the art may completely appreciate how to implement the technical solutions disclosed herein.

The method and apparatus of this application may be implemented in a plurality of manners. For example, the method and apparatus of this application may be implemented by software, hardware, firmware, or a combination thereof. The foregoing sequence of the steps of the method is merely for purpose of description. The steps of the method of this application are not limited to the specific sequence described above, unless being particularly described in other manners. In addition, in some forms, this application may be implemented as programs that are recorded in a recording medium. These programs include machine readable instructions that are used to implement the method according to this application. Therefore, this application further covers the recording medium that stores the programs used for implementing the method according to this application.

Some specific forms of this application are described in detail by means of examples. However, a person of ordinary skill in the art will appreciate that the foregoing examples are merely for purpose of description, and are not intended to limit the scope of this application. A person of ordinary skill in the art will appreciate that the foregoing forms may be modified without departing from the scope and spirit of this application. The scope of this application is defined by the appended claims.

What is claimed is:

1. A DC-DC conversion circuit system, comprising:
a primary switch circuit comprising:
a voltage supply end configured to receive a first direct current voltage; and
an output end;
a charge/discharge circuit comprising:
an input end connected to the output end of the primary switch circuit, and
a first output end configured to output a second direct current voltage; and
a secondary switch circuit comprising:
a voltage supply end configured to receive the first direct current voltage; and
an output end connected to the output end of the primary switch circuit; and
a feedback circuit configured to provide control signals for the primary switch circuit and the secondary switch circuit, wherein the feedback circuit comprises:
a first end connected to a second output end of the charge/discharge circuit, and
a second end connected to a signal end of the primary switch circuit, the second end of the feedback circuit connected to a signal end of the secondary switch circuit by means of a frequency dividing circuit;
wherein the frequency dividing circuit comprises:
a NAND gate circuit;
a first frequency dividing circuit comprising:
an input end connected to the second end of the feedback circuit, and
an output end connected to a first input end of the NAND gate circuit;
wherein the first frequency dividing circuit is an even frequency dividing circuit; and
a second frequency dividing circuit comprising:
an input end connected to the second end of the feedback circuit, and
an output end connected to a second input end of the NAND gate circuit;
wherein an output end of the NAND gate circuit is connected to the signal end of the secondary switch circuit; and
wherein the second frequency dividing circuit is an odd frequency dividing circuit; and
wherein the primary switch circuit is configured to control the charge/discharge circuit to charge or discharge, and
wherein when a charging current or a discharging current of the charge/discharge circuit is greater than a corresponding threshold, the secondary switch circuit is configured to shunt the charging current or the discharging current.

2. The system according to claim 1, wherein:
the primary switch circuit comprises a first PMOS transistor and a first NMOS transistor;
the secondary switch circuit comprises a second PMOS transistor and a second NMOS transistor; and
a dimension of the second PMOS transistor is smaller than a dimension of the first PMOS transistor, and a dimension of the second NMOS transistor is smaller than a dimension of the first NMOS transistor.

3. The system according to claim 2, wherein:
the dimension of the second PMOS transistor is between $1/30$ to $1/10$ of the dimension of the first PMOS transistor, and the dimension of the second NMOS transistor is between $1/5$ to $1/2$ the dimension of that of the first NMOS transistor.

4. The system according to claim 3, wherein:
the dimension of the second PMOS transistor is $1/20$ of the dimension of the first PMOS transistor, and the dimension of the second NMOS transistor is $1/3$ of the dimension of the first NMOS transistor.

5. The system according to claim 1, wherein:
the first frequency dividing circuit is a frequency-halving circuit; and
the second frequency dividing circuit is a frequency-quintiling circuit.

6. A method for forming a DC-DC conversion circuit system, comprising:
providing a primary switch circuit, a charge/discharge circuit, and a secondary switch circuit;
applying a first direct current voltage at a voltage supply end of the primary switch circuit;
connecting an input end of the charge/discharge circuit to an output end of the primary switch circuit, so that a first output end of the charge/discharge circuit outputs a second direct current voltage;
applying the first direct current voltage at a voltage supply end of the secondary switch circuit, and connecting an output end of the secondary switch circuit to the output end of the primary switch circuit;
providing a feedback circuit configured to provide control signals for the primary switch circuit and the secondary switch circuit;
connecting a first end of the feedback circuit to a second output end of the charge/discharge circuit;
connecting a second end of the feedback circuit to a signal end of the primary switch circuit; and
connecting the second end of the feedback circuit to a signal end of the secondary switch circuit by means of a frequency dividing circuit, wherein:
the frequency dividing circuit comprises a first frequency dividing circuit, a second frequency dividing circuit, and a NAND gate circuit;
an input end of the first frequency dividing circuit is connected to the second end of the feedback circuit, and an output end of the first frequency dividing circuit is connected to a first input end of the NAND gate circuit;
an input end of the second frequency dividing circuit is connected to the second end of the feedback circuit, and an output end of the second frequency dividing circuit is connected to a second input end of the NAND gate circuit; and
an output end of the NAND gate circuit is connected to the signal end of the secondary switch circuit; and
the first frequency dividing circuit is an even frequency dividing circuit and
the second frequency dividing circuit is an odd frequency dividing circuit; and wherein the primary switch circuit is configured to control the charge/discharge circuit to charge or discharge, and when a charging current or a discharging current of the charge/discharge circuit is greater than a corresponding threshold, the secondary switch circuit shunts the charging current or the discharging current.

* * * * *